United States Patent [19]

Rajchel

[11] Patent Number: 5,551,640

[45] Date of Patent: Sep. 3, 1996

[54] METHOD OF CONCENTRATING FINE COAL SLURRIES

[76] Inventor: Marcus E. Rajchel, 12803 West 84th Pl., Arvada, Colo. 80005

[21] Appl. No.: 439,871

[22] Filed: May 12, 1995

[51] Int. Cl.⁶ .......................... B02C 19/00; B02C 23/08
[52] U.S. Cl. .......................... 241/21; 241/23; 241/24.31; 241/40; 241/79.1
[58] Field of Search .......................... 241/21, 24, 40, 241/79.1, 23, 24.31

[56] References Cited

U.S. PATENT DOCUMENTS

| | | | |
|---|---|---|---|
| 4,593,859 | 6/1986 | Nakaoji et al. | 241/20 |
| 4,634,451 | 1/1987 | Lipowski et al. | 44/51 |
| 4,645,514 | 2/1987 | Lane et al. | 44/51 |
| 4,687,490 | 8/1987 | Heaton, III et al. | 44/51 |
| 4,765,781 | 8/1988 | Wilks et al. | 406/197 |
| 4,810,259 | 3/1989 | Rakitsky et al. | 44/51 |
| 4,952,317 | 8/1990 | Culkin | 210/636 |
| 5,182,014 | 1/1993 | Goodman | 209/164 |
| 5,277,368 | 1/1994 | Kindig | 241/20 |

*Primary Examiner*—John Husar
*Attorney, Agent, or Firm*—Greenlee, Winner and Sullivan, P.C.

[57] ABSTRACT

A method for concentrating a fine coal slurry having an average particle diameter of 250 microns or less is provided in which the slurry is fed to a liquid-permeable membrane separator which provides a high rate of shear flow horizontal to the membrane. The feed may be heated to increase the flow rate, and crossflow across the membrane may be pulsed to prevent clogging of the membrane. Dispersant may also be added to improve the flow.

24 Claims, 5 Drawing Sheets

METHOD OF CONCENTRATING FINE COAL SLURRIES

FIELD OF THE INVENTION

This invention is in the field of coal processing, specifically, liquid removal from fine coal slurries.

BACKGROUND OF THE INVENTION

Fine coals (having a particle size of less than about 250 microns, and typically less than about 150 microns, are a problem in most coal recovery operations. It is extremely difficult to dewater or remove liquid from fine coal slurries. A disproportionate amount of the moisture in minus 28 mesh×0 filter cake (less than 600 microns) is associated with the minus 100 mesh (150 microns or less) fraction.

The −28 mesh×100 mesh fraction is easily separable from fine coal. Numerous technologies exist for separating and dewatering this size fraction including hydrocyclones, sieve bends and screen-bowl centrifuges.

The −100 mesh fraction has a large surface area to mass ratio or surface area to volume ratio. A filter cake of 60–65 weight percent coal is often the maximum concentration achievable. The handling of such wet coal fines is expensive and difficult. Such materials present a disposal problem, and can shorten the economic life of many mines. At many plants, the fines fraction is dewatered to the greatest extent possible and blended in with the run-of-mine coal. This is done because a) the coal is too valuable to throw away, and b) disposing of fines in silt ponds represents an increasing environmental liability. If the wet fines could be removed from the product without disposal in a settling pond, the value of the mine or preparation plant's product would be improved.

Coal fines from coals with high ash (minerals) content are typically treated by froth flotation to separate the minerals, resulting in a floated fine coal fraction and a fine waste slurry fraction which generally contains fine coal as well as ash particles. The processes of this invention are suitable for concentrating both fractions. Fuel value can be recouped from the floated fine coal fraction, and the ash-containing fraction can be consolidated for more economical disposal.

Electric power utilities using boiler operations require modulation of fuel supply depending upon consumer demand. Modulating control of the flame with pulverized coal is very problematic. Delivery of liquid or gaseous fuels to the combustion chamber provides much more reliable operation. Therefore, in the eastern United States, base-load power is generally supplied through pulverized coal combustion while peak demand is satisfied by oil or gas. However, the cost of these fuels can be three to five times the cost of coal on a per-million-Btu basis.

It has been estimated that in the coal-producing regions of the U.S. alone, there exist between 10 and 50 billion tons of fine coal impounded in settling ponds ("gob piles") at mines which have been closed. Much of this coal is of high quality. Some of it would require some form of beneficiation. Nevertheless, the ponds represent both a huge resource as well as a substantial environmental liability. The technologies to enable utilization of this resource have been limited.

U.S. Pat. No. 4,952,317, incorporated herein by reference, describes horizontally oscillated liquid-permeable membranes useful for removing selected components from colloidal suspension. The invention is disclosed as being useful for separating of particles below 50 microns such as finely divided clays, protein molecules and ions. In practice, the device has generally been used with solids in the sub-10 micrometer range such as pigments, muds, contaminated oils and magnetic media materials.

A method for concentrating coal fines to produce a valuable product in mining and preparation plant operations, and for recovery of coal fines from silt ponds is therefore desirable. Additionally, a method for concentrating high-mineral content fine coal slurries for more economic disposal is desirable.

Prior art patents dealing with fine coal slurries include U.S. Pat. No. 4,593,859 involving preparation of a deashed high solid concentration coal slurry; U.S. Pat. No. 4,765,781 dealing with pipeline transportation of fine coal slurries; U.S. Pat. Nos. 4,810,259, 4,645,514, 4,634,451 and 4,687,490 dealing with methods to improve viscosity and other properties of fine coal slurries; and U.S. Statutory Invention Disclosure 02170914 dealing with the use of dispersants in coal slurries.

SUMMARY OF THE INVENTION

A method for concentrating a slurry comprising coal fines having an average particle diameter of 250 microns or less, is provided comprising:

a) feeding said slurry to a liquid-permeable membrane having a permeate side and a product side, and having pores sufficiently small to prevent passage of said coal fine particles therethrough during operation of the process;

b) providing a high rate of shear flow horizontal to said membrane;

c) removing liquid from said permeate side at a rate permitting flow of product from said product side;

d) recovering concentrated slurry from said product side.

"Fine coal slurries" refers to particles having an average diameter up to and including about 250 microns. The coal fines contain coal particles and may contain ash (mineral) particles. Fine coal waste slurries resulting from beneficiation of fine coal by froth flotation are included in the definition of "fine coal slurries" as is the floated fraction.

The liquid forming the slurry may be water, an aqueous liquid, or an organic liquid. Process parameters expressed in terms of "dewatering" as used herein may also generally be applied to processes for removing organic fluids from fine coal slurries.

A high rate of shear flow is a rate higher than can be achieved by pumping across the surface of the membrane, e.g., between about 10,000 $sec^{-1}$ and about 300,000 $sec^{-1}$.

The methods of this invention are improved by heating the feed slurry to decrease carrier liquid and viscosity and improve flowability characteristics so that flow rate is increased, pulsing the flow across the membrane to keep the membrane clear of particles which impede the flow of liquid therethrough; and adding a dispersant to the feed slurry to improve throughput or flow, increase solids concentration at a given slurry apparent viscosity.

The processes of this invention are capable of concentrating fine and ultra-fine coal (−100 mesh) from any pumpable slurry, e.g., concentrations from just above 0 weight percent to about 70 weight percent. Typical starting concentrations would be about 5 to about 25 weight percent. Typical final concentrations would be about 30 to about 65 or 70 weight percent. For coal water slurry fuel (CWSF) use, concentrations above about 40 weight percent, depending upon quality (heating value) of the coal are generally required.

The product may be capable of serving as a self-burning fuel, to be used as a substitute for oil. The term "self-burning" means that the slurry is capable of being directly burned without further evaporation or mixing with other fuels. Water present in the slurry is evaporated off during the burning process. The product may also be subjected to further concentration e.g. by means of processes known to the art such as belt filter pressing to form briquettes suitable as fuels when the coal has a high enough heat value to warrant such use, or to form a paste such that waste solids can be disposed of by back-filling into depleted and vacated mine-workings to obviate the need for larger-scale settling ponds.

An apparatus is also provided herein for concentrating coal slurry comprising:
  a) a liquid-permeable membrane;
  b) means for applying a high rate of shear flow parallel to said membrane;
  c) means for feeding coal slurry to said membrane;
  d) means for applying pressure to said coal slurry to cause liquid permeate to pass through said membrane;
  e) means for withdrawing permeate from said apparatus;
  f) means for withdrawing product concentrated coal slurry from said apparatus.

The present invention utilizes high-shear crossflow membrane separation to remove water, aqueous or organic fluids from dilute slurries of fine coal. A device which may be modified to achieve such a separation is described in U.S. Pat. No. 4,952,317, incorporated herein by reference. This device is disclosed as being useful for particles in the sub −50 micron range. In practice, the device has been mainly applied to particles in the sub 10 micron range, such as pigments, muds, contaminated oils and magnetic media materials. Adjustments to the process are therefore required when dealing with fine coal slurries which are usually comprised of particles approximately an order of magnitude larger. The larger particle size of fine coal slurries leads to higher flow rates, which creates problems of membrane clogging.

Apparatuses useful for performing the process of this invention include a vessel which can accept the coal/liquid slurry or suspension. The vessel contains two distinct chambers which are separated by a liquid-permeable membrane; the membrane having a pore size which makes it substantially impermeable to suspended coal/coal-waste solids.

The surface of the membrane is vibrated in a direction parallel to the membrane surface to produce a high rate of shear flow. Through one chamber, slurry is circulated across the membrane surface. Concentration of the coal slurry is effected as water or other liquid is withdrawn through the permeable membrane on the permeate side cavity of the separator ("permeate" being clear liquid, also often referred to as "filtrate").

In the continuous process of this invention, dilute coal/coal-waste liquid slurries are continuously fed into the slurry-side cavity via a feed port of the membrane separator while concentrated slurry is withdrawn from the slurry side cavity through a product port. Permeate liquid is continuously withdrawn from the permeate side of the cavity.

The vessel is configured with one or more liquid-permeable membrane leaves in a manner similar to "plate-and-frame" filter presses or heat exchangers. Such a configuration is often referred to as a "membrane stack." A membrane stack may be configured with blinding elements to direct the slurry path consecutively from membrane chamber to membrane chamber (i.e., a series configuration), or divide the slurry flow equally between all membrane cavities (i.e., a parallel configuration) in numerous ways to achieve various series, parallel, or series/parallel operations.

Means are also included in the present invention for applying thermal energy to the feed slurry to increase permeate flow rate. The means of transferring heat to the feed slurry can include any direct or indirect method including, but not limited to heat exchange from a heated fluid, direct injection of steam into the feed slurry, and direct fire heat exchange.

The coal water slurry fuels produced by the processes of this invention have a number of advantages. Being liquid, they may be transportable by centrifugal or other slurry pumps in closed piping systems and stored in closed systems. Fine coal is thereby contained and normally dirty preparation plants can be kept cleaner. These fuels are non-explosive and easier to deliver to a combustion chamber than pulverized coal.

DETAILED DESCRIPTION OF THE PREFERRED EMBODIMENTS

The processes of this invention separate water, aqueous or organic liquids from fine coal slurries, i.e., compositions comprising fine coal particles, including fine coal waste slurries, to produce a concentrated slurry. Fine coal, in the context of this invention, is defined as the fraction of coal particle-containing materials which will pass through a 250 micrometer (60 mesh) opening. Ultra-fine coal is defined as the fraction of coal particles which will pass through a 150 micrometer (100 mesh) opening.

Coal waste is any coal-containing material resulting from the mining or preparation of coal which is not regarded as a salable product. It may include associated minerals and clays resulting from the mining of coal.

Fine coal to be prepared as fuel can be beneficiated prior to concentration by any of a number of existing fine coal cleaning technologies. The tailings from the beneficiation technology can be concentrated with the current invention for more economical disposal.

The fine coal slurry feed material of this invention may be any pumpable stream, from a waste settling pond or a stream from a coal mining or coal preparation plant, and typically has a concentration of between just above 0 weight percent and about 70 weight percent solids, more typically between about 5 and about 25 weight percent solids. The processes of this invention are capable of handling product streams of any pumpable concentration.

The liquid-permeable membranes of this invention may be constructed of any suitable material known to the art, such as TEFLON, polypropylene, cotton, stainless steel, or any other chemically compatible material, preferably TEFLON. They preferably have a pore size sufficiently small to allow liquid to pass and to retain particles having a size between about 0.01 and about 250 microns, more preferably between about 0.1 and about 250 microns during operation of the process, i.e., vibration of the membrane. In a preferred embodiment, the membrane pore size is 0.1 microns, and the permeate is free of suspended solids. Vibration of the membrane allows particles smaller than the pores to be retained with the product slurry.

As will be appreciated by those skilled in the art, the pore size of the membrane and the particle size of the products treated will affect the flow rate of the process. Preferably the process is operated at a flow rate sufficiently high to allow economic operation, but not so high as to cause clogging of the membrane. Preferred feed flow rates are between about 50 gallons per square foot of membrane surface per day (GFD) and about 1,000 GFD, depending upon the solids concentration of the feed, more typically between about 300 GFD and about 500 GFD. Means for conveying the feed to the membrane and providing the appropriate pressure to the feed to cause separation of the liquid include head tank means which provide for gravity flow of the feed to the filter, and pump means, preferably adjustable to achieve the desired flow rate. Pump means providing a pressure of between just greater than 0 psig and about 400 psig are preferred, with means providing a pressure of between about 50 psig and about 200 psig being most preferred.

In a preferred embodiment of this invention, liquid permeate is removed from the permeate side of the membrane at a rate of between about 50 GFD and about 500 GFD, more preferably between about 100 GFD and about 400 GFD. As is shown herein, the rate of removal of the permeate affects the flow rate across the membrane, and should be adjusted to prevent clogging of the membrane.

The membrane is oscillated or vibrated in a direction parallel thereto during operation of the process in order to provide a high rate of shear crossflow which aids in preventing clogging of the filter. Means for oscillating the membrane include an oscillator motor which rotates the filter back and forth, such as through about ten to about fifteen degrees of rotation at frequencies typically up to about 1730 cycles per minute. Slurry is pumped into and travels past the vibrating membrane element. The movement of the membrane creates a shear rate of up to about 300,000 sec$^{-1}$, more typically up to about 150,000 sec$^{-1}$, and helps prevent solids from passing with the liquid. Particles which might become lodged in the openings are dislodged by collisions with free slurry particles. If the membrane starts to become "blinded" by fine particles, the feed may be stopped for a few moments, and the pressure within the membrane cavity equalized, such that particles lodged in the filter are released. Preferably the oscillation has a frequency between about 30 Hz and about 75 Hz. Movement of the membrane may be in a circular direction as described above, or may be in a back and forth direction, typically a distance of between about 0.1 inch and about 6 inches parallel to the membrane.

The processes of this invention produce a product capable of being used as a liquid fuel, for example as a substitute for oil as a boiler feed to electric utility boilers. To be useful as a liquid fuel, the slurry must be self-burning, i.e. must have a low enough water concentration that the water is vaporized during burning and does not prevent continued combustion of the slurry. To be self-burning, a fine coal slurry must have a water concentration which will vary depending on the quality (heat value) of the coal, generally no greater than about 75 weight percent. Preferred self-burning coal water slurry fuels of this invention have a solids concentration greater than or equal to about 40 weight percent.

Concentrated product is recovered from the product side of the membrane preferably by pump means having a flow rate adjusted to maintain a sufficient amount of liquid on the product side so as to allow a high rate of shear crossflow across the membrane as disclosed herein. Generally, product is removed at a rate between about 50 GFD and about 500 GFD, more typically between about 100 GFD and about 300 GFD.

Multiple liquid-permeable membranes may be used in the processes of this invention, and the apparatus for conducting these processes may comprise such multiple membranes configured in series or in parallel.

The feed slurry may be heated as hereinafter described to increase the flow rate. Additionally, the flow of the feed slurry in a direction parallel to the membrane may be pulsed whereby the membrane is kept substantially clear of coal fines build-up. Means for pulsing the crossflow of feed material across the membrane include timer and valve means for modulating the slurry-side and/or permeate-side pressure drop across the separation apparatus, or stopping and starting the feed supply.

Additionally a dispersant preferably selected from the group consisting of organic sulfonates, carboxylic acids and amines is added to said feed slurry to enhance flow rate, reduce apparent product viscosity, and increase product solids concentration at a given viscosity.

Figure 1:
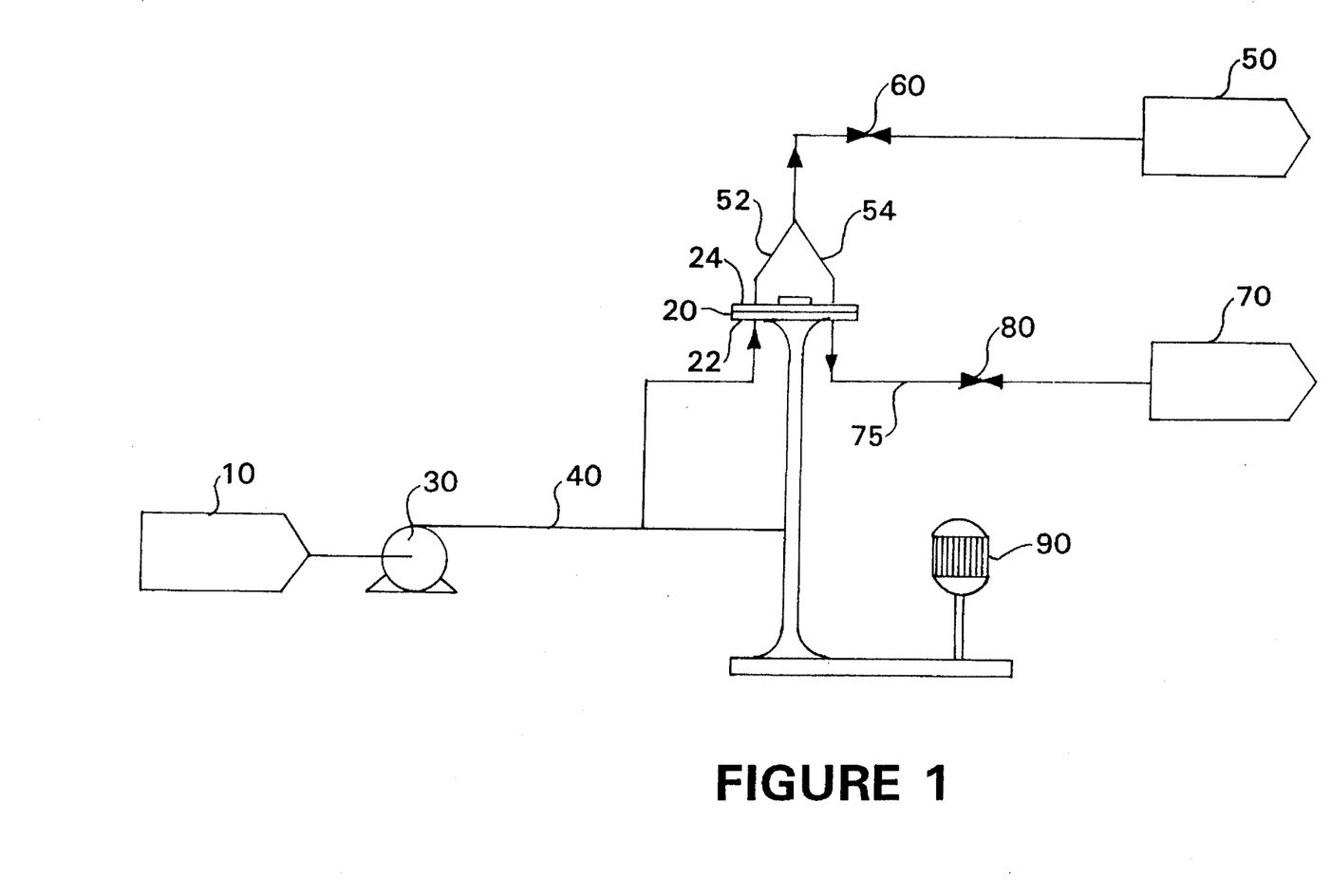
FIG. 1 is a flowsheet showing the process of this invention comprising concentrating fine coal slurry using an oscillating liquid-permeable membrane.

Referring to the figures, FIG. 1 is a flowsheet showing the process of this invention comprising concentrating fine coal slurry using a single oscillating liquid-permeable membrane. Feed slurry stream 10 consisting of dilute fine coal slurry is pumped via feed pump 30 into the slurry side cavity 22 of membrane separator 20 via feed pipeline 40 at a pressure sufficient to provide for slurry flow. Pressure can be generated any number of ways, either by feed pump 30 or by a static-head tank. Permeate stream 50 (separated water or other liquid) is withdrawn from the permeate side cavity 24 of membrane separator 20 via first and second permeate pipelines 52 and 54. A permeate flow-regulating device 60 such as a modulating flow control valve or pilot actuating pressure regulating valve controls the rate of permeate removal. Control of liquid removal rate has been shown to be critical in the process of concentrating fine coal slurries since the coal particles can form a non-flowing paste when the volumetric concentration of coal solids becomes too high, e.g., more than about 55 volume percent.

The clear permeate stream 50 from the process is then discharged at atmospheric temperature. Product slurry stream 70 exits the slurry side cavity 22 of the membrane separator 20 via product slurry pipeline 75. A product slurry pressure regulating device 80 such as a diaphragm or pinch valve controls the slurry side pressure in the slurry side cavity 22 of membrane separator 20 and provides the driving force for liquid removal via the membrane. The concentrated slurry is discharged at any pressure less than that of the slurry side cavity pressure.

The membrane separator 20 material can be any suitable chemically compatible material having a pore size suitable to remove permeate liquid which is substantially free of solids. The membrane separator 20 is operatively connected to an oscillator 90 which causes vibration of the membrane in a direction horizontal to the membrane.

The process using a single unit membrane separator 20 includes the use of separators which utilize multiple membrane filter leaves in a "plate-and-frame" membrane stack configuration.

Start-up of the process should be slow so as to be able to adjust flow rates to avoid clogging of the membrane separator. Wetting of the membrane prior to initiating the process is also recommended, such as with methanol when the membrane is TEFLON, or other fluid recommended by the manufacturer of the membrane material.

Figure 2:
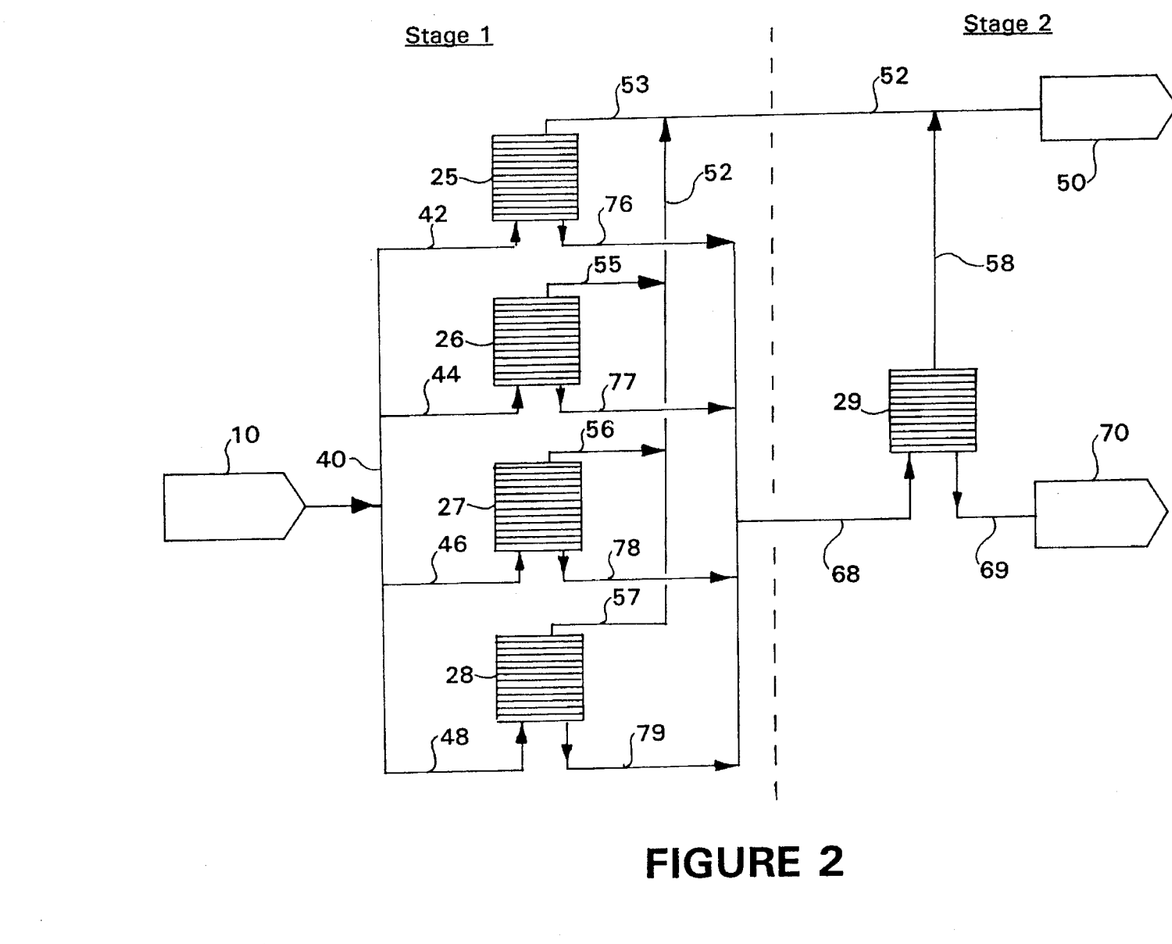
FIG. 2 is a flowsheet showing the process of this invention using multiple liquid-permeable membranes in parallel and series configuration.

FIG. 2 is a flowsheet showing the process of this invention using multiple liquid-permeable membranes in parallel configuration. Such configurations are required when processing requirements exceed the practical capacity of a single membrane separator. As will be appreciated by those skilled in the art, there are many possible variations of the configuration shown in FIG. 2. Multiple membranes or membrane stacks may be used as required, and numerous parallel and series configurations may be used as required to optimize the system.

The feed slurry stream 10 in feed pipeline 40 is split, in this case, into four streams in pipelines 42, 44, 46 and 48 to feed four high-shear membrane separators, first membrane separator 25, second membrane separator 26, third membrane separator 27, and fourth membrane separator 28 in a parallel feed configuration. These four separators constitute a first stage of concentration. The largest portion of liquid to remove from the slurry is separated in the first stage of parallel separators. The flux rate (permeate flow rate) at a given temperature and pressure, with any particular feed slurry particle size composition, decreases with increasing concentration. The optimum process configuration for most large-scale coal slurry concentration processes will utilize multiple stages of separators in which the product of one stage of multiple separators has been reduced in volume to the extent that it may be further concentrated in a second stage or subsequent stage which consists of fewer separators.

For example, when the system in FIG. 2 is used to concentrate 1000 gallons per minute (gpm) of slurry from 5 volume percent to 50 volume percent, the first stage of concentration may be configured to concentrate to 20 volume percent. In this case, the volume of the slurry would be reduced to 250 gpm with 750 gpm of liquid removed (or 187.5 gpm of liquid removed per separator). In the second stage, the 250 gpm of slurry would be concentrated to 100 gpm by removing 150 gpm of liquid.

As will become evident in subsequent descriptions involving the application of heat, staged operation has further advantages with regard to optimum heat usage.

The permeate streams, first permeate stream 53, second permeate stream 55, third permeate stream 56 and fourth permeate stream 58 are combined into permeate stream 52. The concentrated coal/coal-waste slurry streams, first product slurry stream 76, second product slurry stream 77, third product slurry stream 78 and fourth product slurry stream 79 leaving each separator are combined into fifth product slurry stream 68 having an intermediate concentration.

Fifth product slurry stream 68 constitutes the feed to the second, and in this case, the last, stage of concentration. Sixth product slurry stream 69 is the final concentrate and constitutes the final product slurry. The permeate stream from this stage, fifth permeate stream 58, is combined with first permeate stream 52 to constitute the bulk permeate stream.

Figure 3:
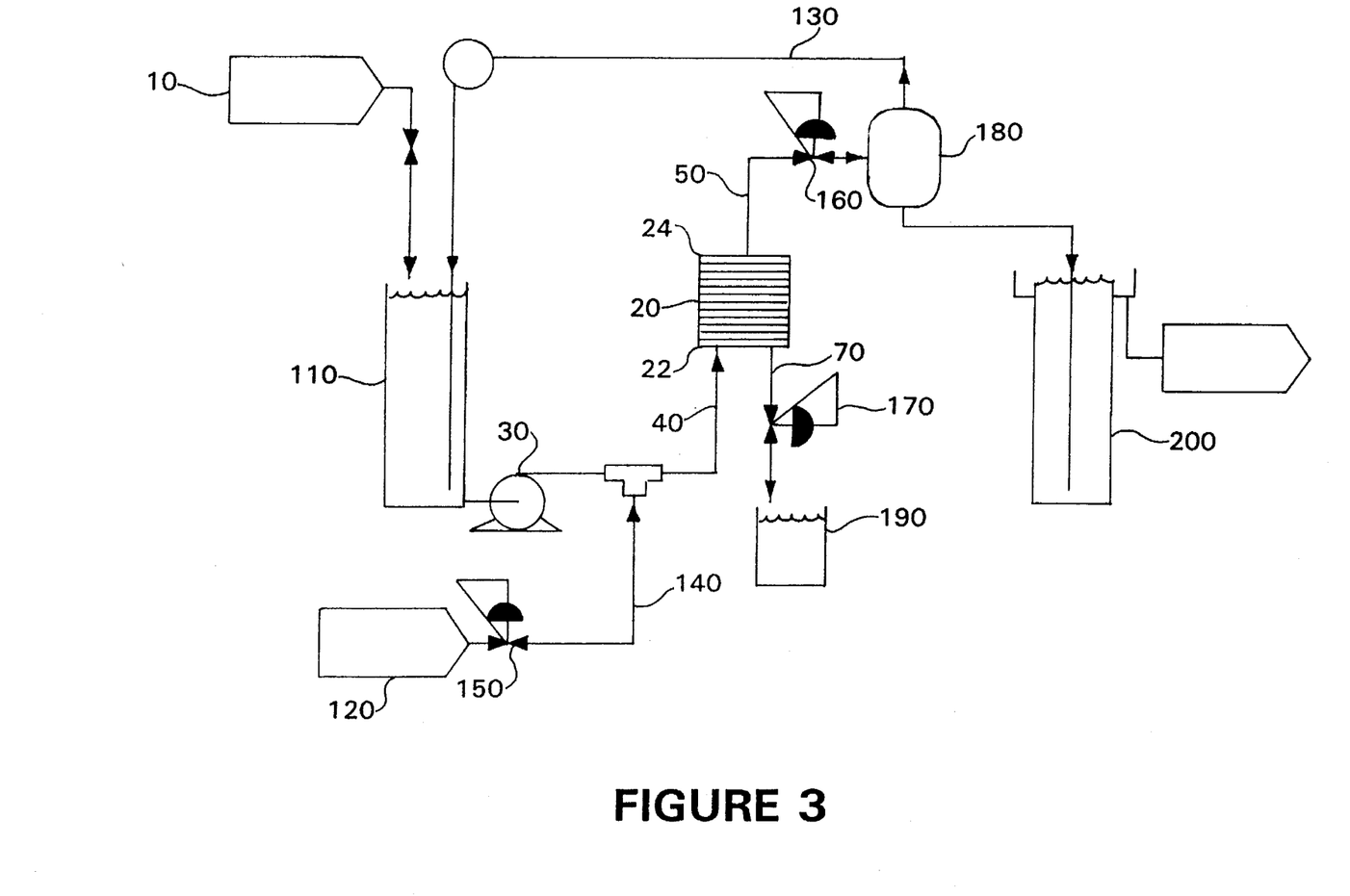
FIG. 3 is a flowsheet showing the use of steam to heat the feed slurry in the process of this invention.

FIG. 3 is a flowsheet showing the use of steam to heat the feed slurry in the process of this invention. As will be appreciated by those of skill in the art, this is only one of many possible configurations of the present invention which utilize the application of heat to improve liquid removal rates. Heat is used to improve liquid removal rates by reducing the viscosity of the carrier liquid. Liquid removal rates from coal/coal-waste slurries have been found to be directly proportional to temperature. The means of introducing heat is not as important as elevation of feed temperature to the vibratory membrane separator.

As shown in FIG. 3, dilute fine coal/coal waste feed slurry stream 10 is introduced to the process preheat tank 110. Heat recovered from downstream in the process is recycled into preheat tank 110 as recycle steam stream 130. As will be appreciated by those skilled in the art, preheating of feed slurry stream 10 can be accomplished in any number of ways including direct injection of steam, indirect heat exchange, or immersion type heating.

The feed slurry stream 10 is pumped by means of feed pump 30 into membrane separator 20. Heat is supplied in this case by direct injection of steam 120 as feed steam stream 140. Flow of feed steam stream 140 is regulated by steam flow regulator 150, which may be a modulating temperature control valve or a modulating pressure control valve. The amount of steam required will depend upon the final target temperature, which is dependent upon the particular application of the technology. The optimum quantity of heat for a given coal or coal-waste slurry normally is dictated by economic considerations. Such economic considerations include the cost of heat and additional equipment modifications which may be required for safe operation at elevated pressures. The discharge pressure of the slurry feed pump 30 must be greater than the vapor pressure of the liquid medium being heated such that the slurry feed is held in the liquid phase. Vapor which is allowed to form in the system piping or membrane separator 20 greatly reduces the performance of the separation since vapor located at the membrane surface inhibits transport of liquid through the membrane.

The feed slurry stream 10 may be heated to any temperature which is not damaging to the material from which the apparatus is constructed. Specifically, when the membrane separator 20 is constructed of TEFLON, the temperature may be as high as 340 degrees F. at 400 to 500 psi. For membranes made of materials resistant to higher temperatures, such as stainless steel, e.g. when coal is being separated from oil, the temperature used may be as high as 750° F.

The heated feed slurry stream 10 enters the membrane separator 20 via feed pipeline 40. Pressure within the separator must be maintained by suitable pressure-regulating devices on both the product slurry side and the permeate side of the membrane, such as permeate flow regulator 160 and product slurry flow regulator 170. These devices include, but are not limited to "pinch" valves and diaphragm valves.

Permeate stream 50 exits membrane separator 20 through a back-pressure control device, permeate flow regulator 160. Pressure within membrane separator 20 such as a pressure control valve, orifice plate or other head-loss mechanism. When the temperature of the permeate stream is higher than the normal boiling point of the slurry's carrier liquid, a flash tank 180 is required to separate vapor from liquid as it is formed at the lower pressure. Vapor exiting the flash tank 180 in recycle steam stream 130 will normally contain the largest fraction of the total heat from the permeate stream 50. Recycle steam stream 130 is directed to the preheat tank 110 for direct injection, although the heat from permeate stream 50 may be transferred to the feed slurry stream 10 by indirect heat exchange as well. Hot water from hot water tank 200 is removed from the system, and may be recycled.

Product slurry stream 70 exits the slurry side 22 of the membrane separator 20 through a product slurry flow regulator 170 which may be a back-pressure control valve or other head-loss device, into a product slurry tank 190. The heat contained in this stream may be recovered by indirect heat exchange with feed slurry stream 10.

When a large amount of liquid is to be removed from a given coal/coal-waste slurry stream, or when a very dilute slurry stream is to be concentrated to a much higher solids loading, staged operation, as described above (FIG. 2) is normally indicated. Referring to FIG. 21, heating the entire volume of feed for stage 1 may not be economically reasonable. However, reduced feed volume and increased solids loading of the slurry stream entering Stage 2 (fifth product slurry stream 68), feed heating can become economically advantageous. In most cases, for a coal/coal-waste slurry of a given particle size make-up, flux rate decreases with increasing solids concentration. The benefits of slurry feed heating the volumetrically smaller feed to Stage 2 (of FIG. 2) justify the heating expense. Heat is recovered from the products of the second stage by exchanging with the feed to the first stage. This improves the flux rate achieved in the first stage of separation and reduces the heat requirement of the second stage.

Figure 4:
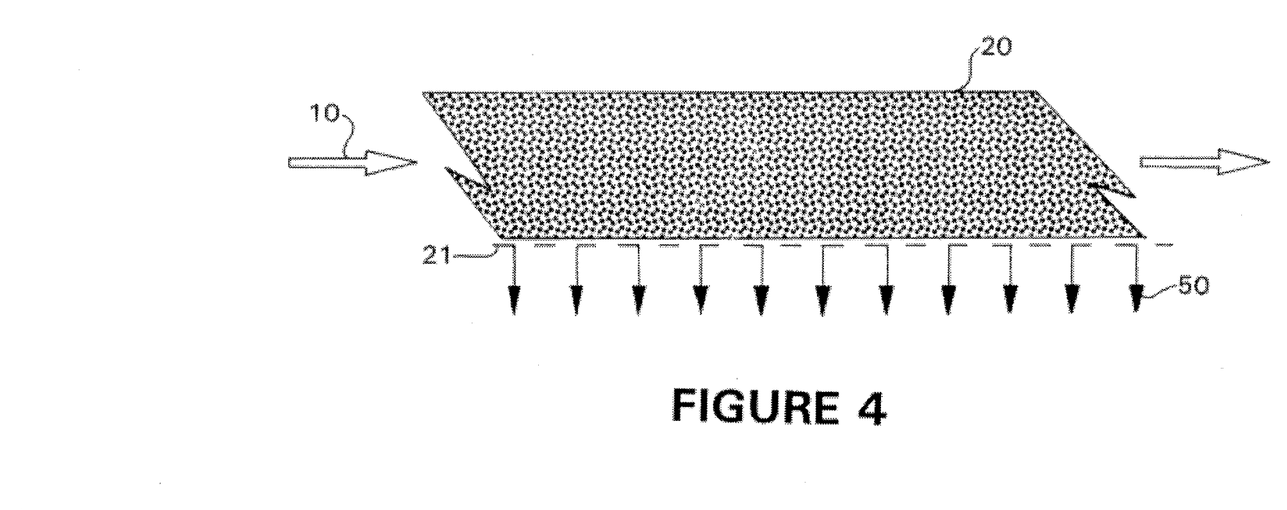
FIG. 4 shows the liquid-permeable membrane at the beginning of the process of this invention.

FIG. 4 shows a liquid-permeable membrane at the onset of liquid removal where slurry particles are uniformly distributed within the liquid phase. Feed slurry stream 10 is pumped in the direction shown by the large arrows from the separator inlet to outlet. Permeate 50 is withdrawn through the membrane surface 21 in the direction shown by the small arrows. (As will be appreciated by those skilled in the art, the permeate side of the membrane may be at the top of the membrane as shown in FIGS. 1–3, at the bottom as shown in FIGS. 4 and 5, or at either side, depending on the configuration of the system).

As withdrawal of liquid at the membrane surface 21 is effected, the concentration of solids at the membrane surface is increased relative to slurry which is further away from the membrane. Since there is no component of flow away from the membrane surface 21, the concentration of solids in close proximity to the membrane increases relative to that of either the feed or the product slurries as shown in the concentration gradient 72 depicted in FIG. 5. The slurry buildup 23 shown in FIG. 5 along the membrane surface is transported from the separator by the component of flow parallel to the membrane surface as shown by the large arrows.

Figure 5:
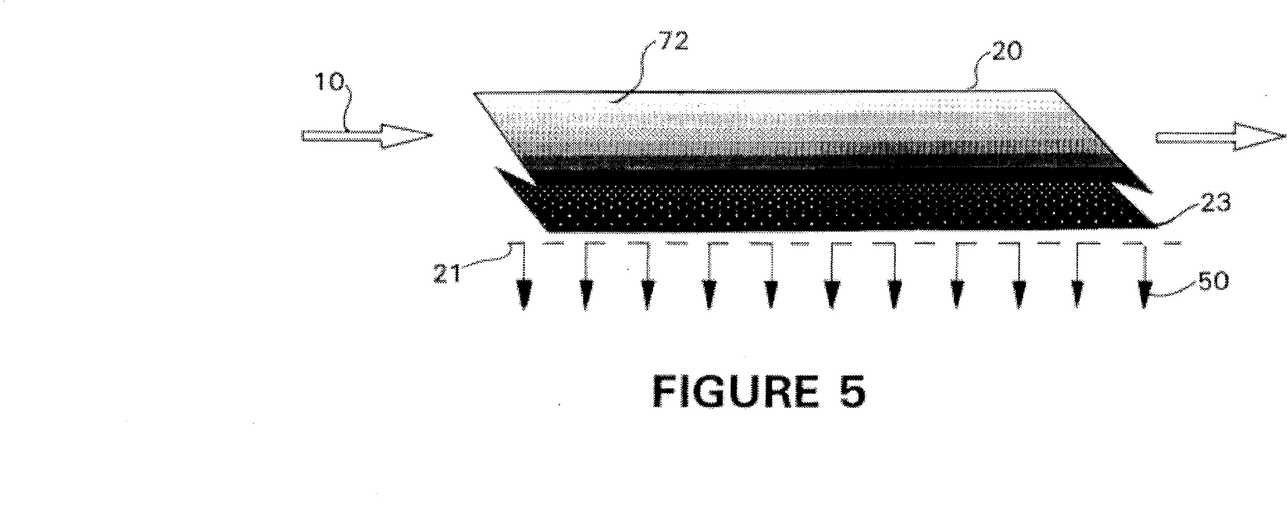
FIG. 5 shows the liquid-permeable membrane under conditions of increasing solids buildup.

The slurry buildup 23 (the bed of thickened slurry) shown in FIG. 5 forms along the membrane surface and provides a resistance to the flow of permeate 50 in the direction shown by the small arrows. If slurry solids were not removed and allowed to accumulate at the membrane surface, the resistance to flow would continue to increase until liquid transport through the bed would cease. The component of flow in the direction of the large arrows displaces the thickened slurry causing it to flow to the discharge. The resistance to flow increases with time from onset of the filtration process and converges to a constant value for a given set of feed flow rate, temperature and pressure conditions. Convergence to a constant resistance to permeate flow corresponds to a constant permeate flux rate for the filtration apparatus. The convergence to a constant permeate resistance occurs when the rate of removal of thickened slurry solids is matched by the rate of new feed solids in the form of dilute slurry.

Applicant has demonstrated that the slurry buildup 23 close to membrane surface 21 can be disturbed in a number of ways. One way is to remove the vector component of flow of permeate normal to the surface of the membrane (i.e. flow in the direction of the small arrows) whilst maintaining membrane vibration. To accomplish this, flow of permeate is stopped, usually by adjusting the permeate flow regulating device 60 (FIG. 1). Specifically, closing a valve regulating pressure of permeate stream 50 while maintaining slurry crossflow in the direction shown by the large arrows of FIGS. 4 and 5 stops the flow of permeate stream 50. Vibration, combined with flow parallel to the membrane surface, sweeps the solids bed from the filtration surface and permeate flux rate improves. Permeate flux rate most often will diminish as a new thickened slurry bed forms. In practice, the procedure of sweeping the solids bed from the membrane surface can be performed at operator discretion, or automatically on a routine basis.

A second means of disturbing the thickened solids bed on the membrane surface involves a rapid cycling of slurry side pressure in the membrane separator apparatus from a relatively higher pressure to a relatively lower pressure (normally down to near zero pounds per square inch gauge (psig)) and returning to the original higher pressure using a pressure flow regulating device downstream (i.e. after the discharge of the separator), such as product slurry pressure regulating device 80 of FIG. 1. When the slurry-side pressure is rapidly reduced, flow in the direction of the large arrows of FIGS. 4 and 5 increases. As a result of the slurry-side pressure reduction, the pressure in the permeate side is also reduced. Normally, the permeate-side pressure is greater than the new lower slurry-side pressure. In this case a momentary backflow or nonflow of permeate, combined with the vibration of the membrane surface causes the slurry bed to be broken and mixed with dilute slurry above the bed and carried out of the separator apparatus.

The normal operating pressure of the permeate side of the membrane is not required to be greater than the low pressure interval of the pressure cycling procedure. Solids bed disturbance due to slurry-side pressure cycling can also be achieved when the permeate side of the apparatus is at ambient pressures.

The procedure may be repeated several times in rapid succession to improve the effect upon permeate flux rate. In this case, slurry-side pressure is cycled between the normal operating pressure, the relatively high pressure, and low pressure which is normally just above zero psig, and then to operating pressure to provide multiple slurry bed disturbances.

The cycles or pulses may be controlled by a timer and optimized as to frequency and duration as will be apparent to those skilled in the art, to keep the membrane separator substantially free of slurry buildup. For example, cycling to zero psig for a period of about a half second to about three seconds at intervals of about a half minute to five minutes should be effective to keep the membrane clear, depending on the size of the machine, concentration of the slurry, operating temperature and pressure, and other variables.

The processes of this invention can be enhanced by simultaneously applying heat to the slurry feed and providing a slurry-side pressure cycling strategy as described above. Application of these combined strategies has an effect which provides water removal rates which are better than implementation of either strategy alone.

The processes of this invention can be further enhanced through the use of surface-active agents to improve product rheological characteristics and solids concentration. Surface-active agents such as anionic, cationic and non-ionic dispersants can be used in conjunction with the methods described above to provide customized slurry properties, especially at higher solids concentrations, e.g. above about 50 weight percent solids. Dispersants, such as organic sulfonates, can be used to achieve higher solids concentrations while maintaining favorable rheological properties and improved slurry stability with respect to prevention of settling. Stabilizers such as xanthan and guar gums can be added to the process whenever a high degree of slurry stability with respect to prevention of settling is desired.

As will be appreciated by those skilled in the art, all or a portion of the product slurry stream may be recycled to the process for further concentration.

EXAMPLES

Example 1. Self-burning coal water slurry fuel

Fine coal slurries containing coal particles of −150 mesh were prepared by removing water from the fines to achieve solids concentrations in the range of 47 to 50 weight percent. An acceptable modulating fuel slurry for co-firing with pulverized coal was produced. As shown in the following examples, the processes of this invention were used to produce similar self-burning fuels.

Example 2. Coal Slurry Concentrates Using Membrane Separator

Five to six gallon aliquots of dilute slurries were used for concentration tests. Runs 1 and 2 used a coal preparation plant cyclone overflow, containing coal fines as used in Example 1, were concentrated to the desired specification for coal water slurry fuel using a laboratory scale crossflow membrane separator (V-SEP™ technology from New Logic International of Emeryville, Calif.). The coal fines for runs 1 and 2 substantially comprised −150 micron×0 mesh Upper Freeport coal which is a relatively low volatile (soft) coal originating from a fine coal froth floatation cleaning circuit. Runs 3 and 4 utilized a nominally 98% minus 100 mesh slurry of Pittsburgh No. 8 coal obtained from the Consolidation Coal Company.

Slurry concentration rates were achieved suitable for economic scale up. The results are shown in Table I.

Run No. 1 utilized as-received coal slurry having a particle size distribution between 98% passing 150 microns. Run No. 2 was run at high temperature (about 125° F.) using the same material as Run No. 1. Runs 3 and 4 utilized coarse coal having a particle size range about 98% passing 250 microns. Runs 5, 6 and 7 used coal fines having a bimodal particle size range (about 20% smaller particles having a size comprised 95% of −20 microns, and about 80% larger particles having a size comprised of 95% −150 microns). Stability was improved with the bi-modal preparations.

In the runs using coarse coal, increasing system pressure (i.e. slurry-side gauge pressure) had a significant effect upon flux (permeate flow) rate. Early in the test, after equilibrium flow rate had been established, the effect of increasing system pressure was investigated. At low (0 psig) system pressure, the flux rate was about 89 GFD. When the pressure was increased to 40 psig, the flux rate increased and stabilized at 127 GFD. AT 60 psig, the flux rate stabilized at about 137 GFD.

The maximum practical feed rate for this laboratory test, irrespective of solids concentration, was found to be about two gallons per square foot per minute. The maximum flow rate of clear water through the 0.11 micron Teflon membrane and support cloth was about 1,200 to 1,500 GFD. Upon start-up, and before an equilibrium solids distribution within the separator has been established, permeate flow rates of this order of magnitude are possible.

For example, if the particle size distribution and particle density characteristics of the slurry solids are such that the slurry is a non-flowing paste at 60 weight percent solids, then feed slurry which is already at a relatively high concentration, e.g., 38–42 weight percent solids, cannot sustain very high water removal rates (i.e., about 1,000 GFD), at normal feed slurry flow rates of less than two gallons per square foot per minute, without becoming a not-flowing paste. When the initial slurry is at a relatively low initial concentration, e.g., 20–22% solids, a great deal more water (on a unit basis) must be removed before the slurry becomes a non-flowing paste. In this case, the required permeate flow rate to cause formation of a non-flowing paste would be greater than the physical capacity of the membrane to pass permeate.

It was found that water removal rates must be controlled, particularly upon start-up, when the feed slurry to the separator has a relatively high solids concentration.

Example 3. Dispersant

Slurry stability of fine coal slurries as described in Example 2 was improved by the addition of small quantities (about 0.01 to about 1 weight percent coal basis) of A-23-M™ ammonium naphthalene sulfonate dispersant (Henkel Corporation, Philadelphia, Pa). The polar/non-polar functionality of the dispersant molecule is believed to inhibit

TABLE I

Coal Water Slurry Concentration Before and After Crossflow Membrane Separation

|  | No. 1 | No. 2 | No. 3 | No. 4 | No. 5 | No. 6 | No. 7 |
| --- | --- | --- | --- | --- | --- | --- | --- |
| Feed Conc. (wt %) | 39.4 | 41.8 | 24.2 | 41.4 | 22.1 | 39.4 | 37.2 |
| Product Conc. (wt %) | 36.5 | 48.4 | 44.8 | 50.0 | 50.9 | 54.9 | 49.5 | settling by creating an electrical boundary layer around the coal particles.

Example 4. Flux (Permeate Flow) Rate Versus Temperature

Five weight percent Mohave centrate slurry was used for the experiment. The containers were shaken to re-suspend the solids. The mixture was added to the feed tank. The tare weight of the containers was recorded and a net feed calculated.

Heat and agitation were applied to the feed tank. During the run, the slurry was pumped through the membrane separator with all separated water returned to the feed.

When the feed slurry had reached the target temperature of 180° F., flux (permeate flow) rate measurements were recorded every five to ten minutes. When the flux rate stabilized, (i.e., several consecutive similar readings), slurry concentration was started. Slurry concentration was initiated by diverting the permeate flow to a weighed collection vessel.

A strong dependence of flux (filtration) rate on temperature was observed. During heat-up of the feed slurry for the run, flux rates were periodically recorded. (The effect of increased solids concentration due to evaporation during this interval is thought to be small and is neglected.)

Figure 6:
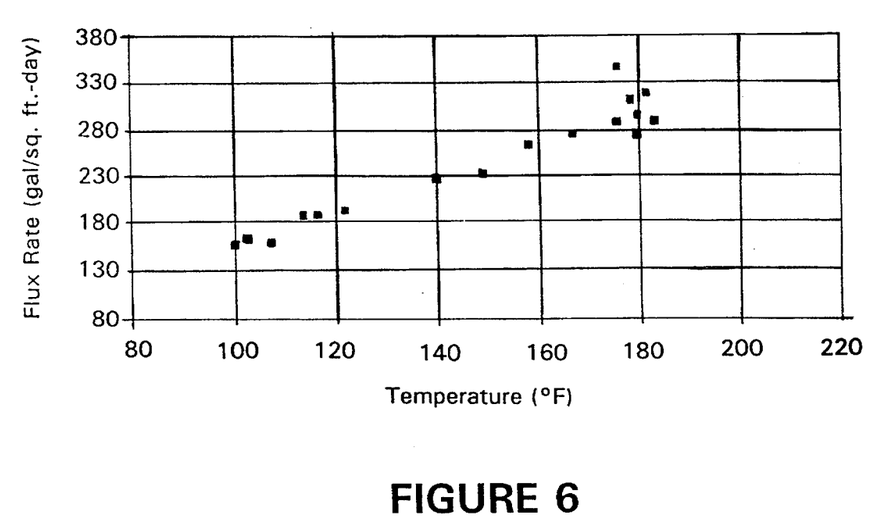
FIG. 6 is a graph illustrating flux (permeate flow) rate versus temperature for a 5 weight percent Mohave centrate concentrated by the process of this invention.

FIG. 6 illustrates the temperature/flux-rate relationship for the as-received 5 weight percent Mohave centrate. A linear regression analysis of the data yields the following equation for flux rate versus temperature for the Mohave centrate slurry for the dewatering conditions of the test.

$$F=1.859(T)-31.2 \quad \text{(Eq.1)}$$

where F is the flux rate and T is the feed slurry temperature in degrees Fahrenheit. The correlation coefficient, r, for the data is 0.96.

The equation predicts a flux rate of 303 GFD at run temperature of 180° F. If the data is extrapolated to a feed slurry temperature of 210° F., an initial flux rate of 360 gallons per square-foot per day is predicted. This extrapolation is probably not unreasonable. This statement is supported by the following:

a. The viscosity of water decreases with increasing temperature. Filtration rate is inversely proportional to the viscosity (See "Unit Operations", McCabe and Smith, McGraw-Hill, and "Perry's Chemical Engineering Handbook).

b. The membrane separator can be operated at elevated pressures and temperatures such that operation at up to the material limits of the membrane material are possible.

Toward the end of two separate runs, the level of the feed tank had diminished such that the feed could no longer be effectively heated or stirred by the heating elements associated with the tank. Since the slurry was no longer being heated, the temperature of the feed fell off dramatically. As a result, the flux rates recorded toward the end of each run were substantially diminished compared with that which would be achieved in practice.

For example, at the beginning of the first run, when the feed temperature had reached 144 degrees Fahrenheit (60° C.), the recorded flux rate for the 5% feed was 236 GFD. At the final temperature of 180° F., the flux rate was about 305 GFD; about 25%. At the end of the run, the temperature had fallen back to about 144° F.

Data taken from the first run can be used to compute temperature correction factors for flux rates recorded at temperatures other than the target. Table II below compares measured flux rates with falling temperature with the same data which has been temperature corrected according to Equation 1.

TABLE II

Temperature Correction for Flux Rate

| Temperature (°F.) | Solids Loading | Measured Cumulative Average Flux Rate (GFD) | Temperature Corrected Cum. Avg. Flux Rate (GFD) |
|---|---|---|---|
| 178 | 6.38% | 332 | 336 |
| 172 | 8.73% | 325 | 334 |
| 165 | 12.18% | 298 | 312 |
| 156 | 17.91% | 273 | 292 |
| 154 | 24.89% | 242 | 262 |
| 147 | 33.57% | 215 | 234 |

Example 5. Effect of Pressure Pulsing

The effect of pressure pulsing was measured during the procedures of Example 4. The slurry-side pressure for the first run was held at 150 psig. The second run was performed at 100 psig pressure. The results of each test were nearly identical.

For example, the slurry-side pressure during the second test was increased from 100 psig to 200 psig and the flux rate observed. Initially, the flux rate increased dramatically, but over the course of several minutes, fell back to the value observed at the lower pressure.

In crossflow membrane separations (shear-enhanced membrane separations) of this invention, for a given solids concentration and for a given feed material, a "bed" of solids forms in a thin layer close to the membrane surface. This "bed" is not a cake, rather, a higher concentration of slurry relative to either the feed or the product slurry.

The layer takes a finite period of time to form; in the case of the Mohave centrate material, it appears to form over a period of about 3–5 minutes, depending upon temperature, crossflow rate, and solids loading.

It was found by this investigator that the rate of water removal could be enhanced by 10–20 percent by disturbing this layer over regular intervals. The disruption in the filter bed was achieved by modulating the slurry side pressure between the (slurry side) normal operating pressure and zero (psig) and back to normal. Table III lists some data taken during the second run which illustrates this effect.

TABLE III

Effect of Pressure Cycling

| Flux Before Pressure Cycling (GFD) | Flux After Pressure Cycling (GFD) | Improvement (pct.) |
|---|---|---|
| 295 | 324 | 10% |
| 252 | 295 | 17% |
| 221 | 250 | 13% |
| 166 | 185 | 12% |
| 98 | 101 | 3% |

The foregoing examples are illustrative rather than limiting. The scope of the invention is defined by the appended claims.

I claim:

1. A method for concentrating a slurry comprising coal fines having an average particle diameter of 250 microns or less, comprising:
    a) feeding said slurry to a liquid-permeable membrane having a permeate side and a product side, and having a pore size between about 0.1 and about 250 microns;
    b) providing a high rate of shear flow parallel to said membrane;
    c) pulsing said flow parallel to said membrane to reduce buildup of coal fines on said membrane;
    d) removing liquid from said permeate side at a rate permitting flow of product from said product side;
    e) recovering concentrated slurry from said product side.

2. The method of claim 1 comprising the use of multiple liquid-permeable membranes.

3. The method of claim 1 wherein said slurry is a beneficiated stream from which minerals have been previously removed.

4. The method of claim 1 wherein said slurry is a high-mineral content coal slurry waste.

5. The method of claim 1 wherein said liquid-permeable membrane is oscillated parallel to the membrane surface to produce a horizontal shear flow.

6. The method of claim 1 wherein said product slurry has a concentration of between about 30 and about 70 weight percent.

7. The method of claim 1 wherein said liquid-permeable membrane is made of TEFLON.

8. The method of claim 1 wherein said concentrated coal slurry is a combustible, self-burning liquid fuel.

9. The method of claim 1 wherein said slurry of step (a) is heated.

10. The method of claim 1 wherein a dispersant is added to said slurry of step (a).

11. The method of claim 10 wherein said dispersant is selected from the group consisting of organic sulfonates, carboxylic acids and amines.

12. The method of claim 1 wherein said concentrated slurry of step (d) is used as an improved feed for conventional filtration apparatuses.

13. An apparatus for concentrating coal slurry comprising:
    a) a liquid-permeable membrane;
    b) means for applying a shear flow parallel to said membrane;
    c) means for feeding coal slurry to said membrane;
    d) means for applying pressure to said coal slurry to cause liquid permeate to pass through said membrane;
    e) means for pulsing said flow parallel to said membrane;
    f) means for withdrawing permeate from said apparatus;
    g) means for withdrawing product concentrated coal slurry from said apparatus.

14. The apparatus of claim 13 wherein said means for applying a shear flow parallel to said membrane comprises an oscillator to vibrate said membrane.

15. The apparatus of claim 13 wherein said apparatus comprises means for heating said coal slurry feed to said membrane.

16. The apparatus of claim 15 wherein said means for heating said coal slurry feed comprises means for producing steam and introducing said steam into said feed slurry.

17. The apparatus of claim 13 wherein said means for applying pulsed crossflow to said membrane comprise means connected to a timer for stopping and starting the flow of said product slurry.

18. The apparatus of claim 13 wherein said means for applying pulsed crossflow to said membrane comprise means connected to a timer for stopping and starting the flow of permeate.

19. A method for concentrating a slurry comprising coal fines having an average particle diameter of 250 microns or less, comprising:
    a) feeding said slurry to a liquid-permeable membrane having a permeate side and a product side, and having a pore size between about 0.1 and about 250 microns;
    b) providing a high rate of shear flow parallel to said membrane;
    c) heating said slurry to increase the liquid removal rate;
    d) removing liquid from said permeate side at a rate permitting flow of product from said product side;
    e) recovering concentrated slurry from said product side.

20. The method of claim 19 wherein the heating is accomplished by contacting the slurry with steam.

21. The method of claim 19 wherein the slurry is heated to a temperature up to 750° F.

22. An apparatus for concentrating coal slurry comprising fine coal comprising:
    a) a liquid-permeable membrane;
    b) means for applying a shear flow parallel to said membrane;
    c) means for feeding coal slurry to said membrane;
    d) means for applying pressure to said coal slurry to cause liquid permeate to pass through said membrane;
    e) means for heating said coal slurry;
    f) means for withdrawing permeate from said apparatus;
    g) means for withdrawing product concentrated coal slurry from said apparatus.

23. The apparatus of claim 22 wherein said means for heating said coal slurry comprise means for direct injection of steam.

24. The apparatus of claim 22 wherein said means for heating said coal slurry comprise means for indirect heat exchange.

* * * * *